United States Patent
Boutenko et al.

(10) Patent No.: US 7,106,894 B1
(45) Date of Patent: Sep. 12, 2006

(54) METHOD FOR REDUCING X-RAY NOISE

(75) Inventors: Vladislav Boutenko, Boulogne-Billancourt (FR); Thierry Lebihen, Versailles (FR)

(73) Assignee: GE Medical Systems SA, (FR)

( * ) Notice: Subject to any disclaimer, the term of this patent is extended or adjusted under 35 U.S.C. 154(b) by 0 days.

(21) Appl. No.: 09/503,022

(22) Filed: Feb. 14, 2000

(30) Foreign Application Priority Data

Feb. 18, 1999 (FR) .................................. 99 02032

(51) Int. Cl.
*G06K 9/00* (2006.01)

(52) U.S. Cl. ...................................... 382/132; 382/131

(58) Field of Classification Search ........ 382/132–133, 382/210, 260, 263, 272, 106, 131, 107, 265, 382/128, 130; 378/42; 128/922; 356/39; 377/10
See application file for complete search history.

(56) References Cited

U.S. PATENT DOCUMENTS

| | | | |
|---|---|---|---|
| 4,542,459 A * | 9/1985 | Riederer ..................... 600/431 |
| 4,633,494 A | 12/1986 | Klausz |
| 5,309,237 A | 5/1994 | Singh |
| 5,467,380 A * | 11/1995 | De Jonge et al. .......... 378/98.2 |
| 5,646,867 A * | 7/1997 | Ozcelik et al. ......... 375/240.14 |
| 5,684,720 A | 11/1997 | Hein |
| 5,909,515 A * | 6/1999 | Makram-Ebeid ............ 382/260 |
| 6,151,417 A * | 11/2000 | Florent ........................ 382/265 |
| 6,204,891 B1 * | 3/2001 | Florent ........................ 348/616 |
| 6,295,336 B1 * | 9/2001 | Aach et al. .................. 378/108 |
| 6,360,025 B1 * | 3/2002 | Florent ........................ 382/261 |
| 6,430,318 B1 * | 8/2002 | Florent et al. .............. 382/260 |
| 6,436,041 B1 * | 8/2002 | Phillips et al. .............. 600/437 |
| 6,623,428 B1 * | 9/2003 | Miller et al. ................ 600/300 |
| 6,647,135 B1 * | 11/2003 | Bonnefous .................. 382/128 |
| 6,753,524 B1 * | 6/2004 | Matsui et al. ............... 250/310 |
| 6,809,758 B1 * | 10/2004 | Jones ..................... 348/208.99 |
| 2001/0017937 A1 * | 8/2001 | Bonnefous .................. 382/128 |
| 2002/0099857 A1 * | 7/2002 | Lowe et al. ................. 709/250 |
| 2003/0053709 A1 * | 3/2003 | Olivieri ....................... 382/261 |
| 2003/0095721 A1 * | 5/2003 | Clune et al. ................. 382/294 |
| 2003/0113034 A1 * | 6/2003 | Komiya et al. ............. 382/284 |
| 2004/0184647 A1 * | 9/2004 | Reeves et al. .............. 382/131 |
| 2004/0209237 A1 * | 10/2004 | Flewelling et al. ............ 435/4 |
| 2005/0041842 A1 * | 2/2005 | Frakes et al. ................ 382/128 |

OTHER PUBLICATIONS

Aufrichtig, R et al: "X-Ray Fluoroscopy Spatio-Temporal Filtering with Object Detection" IEEE Trans. on Medical Imaging. vol. 14 No. 4 Dec. 1, 1995 p. 733-746.

* cited by examiner

*Primary Examiner*—Matthew C. Bella
*Assistant Examiner*—Duy M. Dang
(74) *Attorney, Agent, or Firm*—Cantor Colburn LLP

(57) ABSTRACT

For each acquired current image, the displacement of said current image is determined relative to the acquired preceding image in the image acquisition plane, a displaced preceding filtered image is elaborated by spatially displacing the preceding filtered image, taking said displacement into account, and the current filtered image is elaborated by the weighted average between the acquired current image and the displaced preceding filtered image, so as to improve the quality of the images visualized.

12 Claims, 1 Drawing Sheet

METHOD FOR REDUCING X-RAY NOISE

CROSS REFERENCE TO RELATED APPLICATIONS

This application claims the benefit of a priority under 35 U.S.C. 119 to France Patent Application No. 99 02032 filed Feb. 18, 1999, the entire contents of which are hereby incorporated by reference.

BACKGROUND OF THE INVENTION

The invention concerns the fluoroscopy and, in particular, the treatment of a sequence of fluoroscopic images of a body, particularly of a human body.

The invention further applies, in particular, to cardiac fluoroscopy.

By comparison with radiography in acquisition mode, where the X-ray doses are greater, in order to obtain better quality registered images for diagnostic purposes, fluoroscopy is carried out with weaker X-ray doses and is, in particular, used in the surgical field, for example, to position coronary endoprostheses ("stent" in English) by means of catheters.

In fluoroscopy the movement of the objects of interest, like, for example, coronary endoprostheses, as well as, notably, in cardiac fluoroscopy, the background movement, associated linked, for example, with the patient's respiration, as well as with the movements of the table on which the patient is placed, produce disturbances in the images, to which is added noise, particularly of electrical origin. That noise is all the more disturbing, the longer the fluoroscopic examination lasts, typically about 45 minutes, in order to position an intravascular prosthesis correctly, and produces, consequently, a visual inconvenience for the physician.

In the presence of immobile images, the noise could easily be eliminated by simple temporal filtering. However, in fluoroscopy mobile images are present, which are translated, if a filtering of images (for example, a filtering by temporal means) is simply carried out, by a blurred movement or else a loss of contrast of the mobile objects (depending on the size of the objects). In other words, there is then no difference between the arrival and departure of an object of interest and a noise peak.

At present, the standard algorithms of image processing in fluoroscopy resort to a criterion of distinction between a variation due to noise and a variation due to movement. The filtering treatment is then stopped or diminished in the presence of a movement. However, the cessation of filtering produces a recurrence of the noise, which is translated on the images by noise trails behind the mobile objects.

BRIEF DESCRIPTION OF THE INVENTION

The invention is intended to offer a more satisfactory solution to these problems.

The invention therefore proposes a method of treatment of a sequence of fluoroscopic images of a body, comprising the acquisition of a sequence of images, the elaboration for each acquired current image of a current filtered image from the acquired current image and preceding filtered image, and visualization of the sequence of filtered images.

According to a general characteristic of the invention, for each acquired current image, the displacement of said current image is determined in relation to the preceding image acquired in the image acquisition plane, a so-called "displaced" preceding filtered image is elaborated, by spatially displacing the preceding filtered image, taking said displacement into account, and the current filtered image is elaborated by the weighted average between the acquired current image and the displaced preceding filtered image, so as to improve the quality of the images visualized.

When the body is laid on a movable table, the displacement of said current image is advantageously determined in the plane of acquisition of the images from the displacement value of the table, the spatial orientation of the plane of acquisition relative to the table and the distance of that plane of acquisition relative to the table.

As a variant, one can also determine the displacement of said current image in the plane of acquisition of the images from the content of those acquired images.

DETAILED DESCRIPTION OF THE INVENTION

Figure 1:
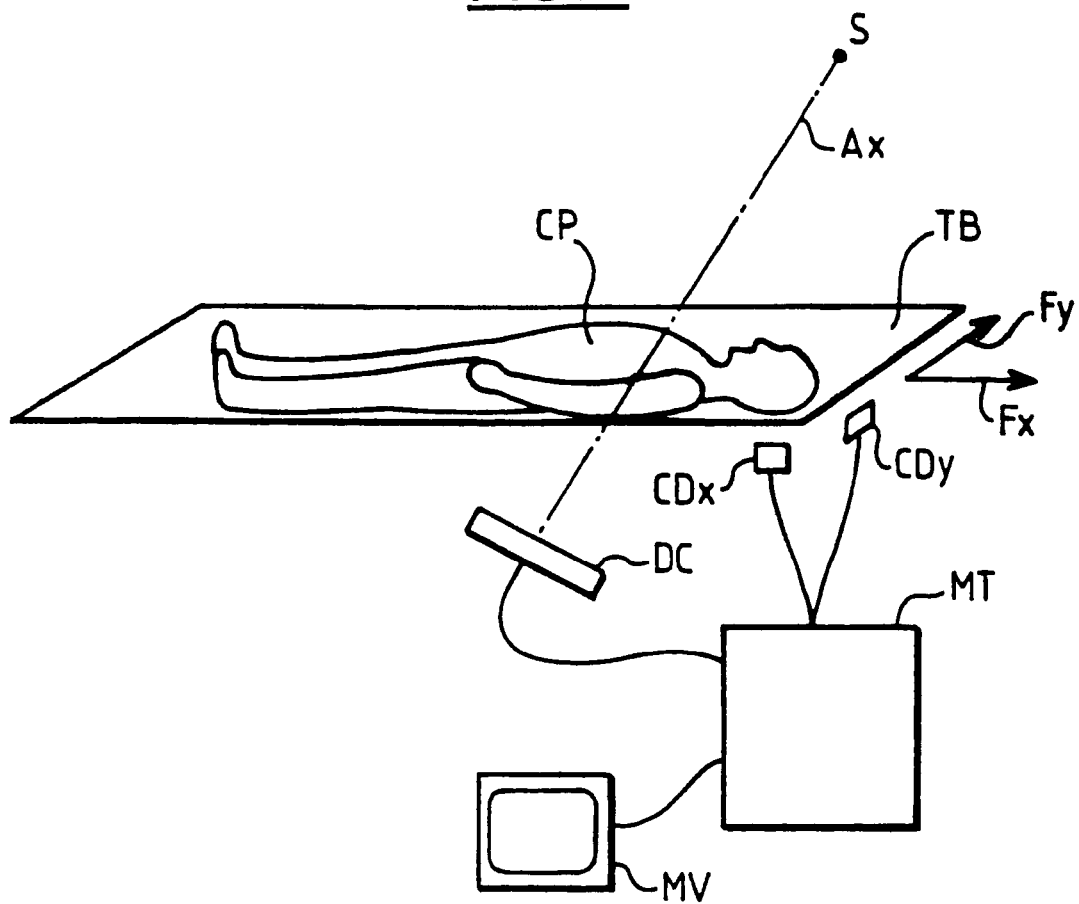
FIG. 1 schematically illustrates a system making possible a use of the method according to an embodiment of the invention.

In FIG. 1, reference TB designates a table translatable in two orthogonal directions Fx and Fy by means of a crank, for example, not represented here for purposes of simplification. Displacement sensors CDx and CDy, of construction known per se, make it possible to determine the values of the displacements in directions Fx and Fy respectively and deliver that information to treatment means MT containing a microprocessor.

On the table TB, a patient CP is stretched out and undergoes a fluoroscopy examination. In that regard, the fluoroscopy apparatus contains an X-ray source S emitting X-rays along an axis Ax in the direction of a detector DC of standard con-struction known per se, also connected to the treatment means MT. The detector DC is a plane detector, forming the image acquisition plane. This plane is perpendicular to axis Ax. The detector DC and the source S form part of an apparatus containing an arm moving in space around the patient CP.

The orientation of the axis Ax is known perfectly at every moment, as is the distance between the table TB and the detector DC. The displacements in directions Fx and Fy of the table TB can therefore be easily converted in a standard manner known per se into displacements u and v in the plane of the detector DC, that is, in the image acquisition plane.

Figure 2:
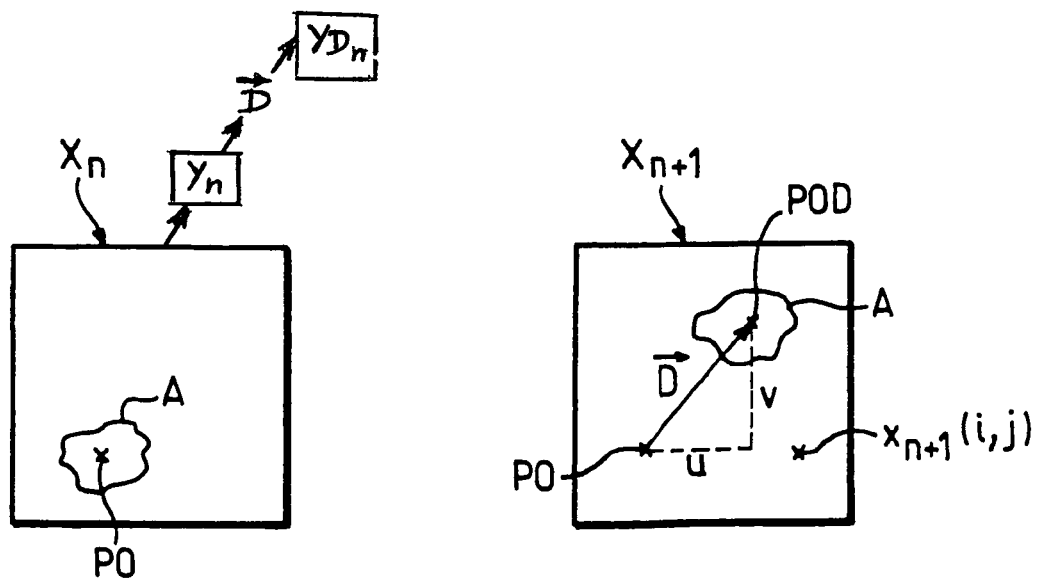
FIG. 2 schematically illustrates two successive acquired images.

Reference is now made, in particular, to FIG. 2. It can be seen that, on fluoroscopy examination, a sequence of images Xn is acquired, typically at the rate of 30 images per second. The pixel values of each image are stored, as they are acquired, in a memory of treatment means MT, in order to permit image processing and, in particular, their filtering.

This being so, when in the course of the fluoroscopy examination the physician moves the table TB and/or the coronary endoprosthesis so as to keep the region of the body considered in the field of X-radiation, the object of interest (for example, the coronary endoprosthesis), which is very schematically represented under reference A in the image $X_n$, is moved from the displacement vector D into the following image $X_{n+1}$ (PO and POD respectively representing the centers of the prosthesis in both images).

The displacement vector $\vec{D}$ has the coordinates u and v in the image acquisition plane, corresponding to displacement of the table in directions Fx and Fy (it is assumed here that only the table has moved).

The invention provides here for carrying out a filtering treatment by using, on the one hand, the current acquired image $X_{n+1}$ and, on the other, not the preceding filtered image directly corresponding to the preceding acquired image, but a displaced filtered image YD.

More precisely, one implements in the microprocessor recursive law (1):

$$Y_{n+1} = (1-a)X_{n+1} + aYD_n \qquad (1)$$

in which $Y_{n+1}$ represents the current filtered image, $X_{n+1}$ the current acquired image, $YD_n$ the preceding filtered image displaced relative to the preceding filtered image $Y_n$ and "a" a weighting coefficient, typically equal to 0.2 (and possibly a function of $X_{n+1}$ and of $YD_n$).

The law (1) is translated for each pixel of coordinates i,j in the image acquisition plane by law (2):

$$y_{n+1}(i,j) = (1-a)x_{n+1}(i,j) + ay_n(i-u, j-v) \qquad (2)$$

In other words, for each pixel of coordinates i,j of the acquired current image, the coordinates I,J of the displaced pixel are calculated in the preceding filtered image, taking into account the movement of the table (I=i–u, J=hj–v), and law (2) is applied.

The successive filtered images $Y_{n+1}$ are successively displayed on the means of visualization MV of the fluoroscopy device.

When coordinates I and J are negative, that is, when there is no equivalent in the preceding image for a portion of the outlet image $Y_{n+1}$, that image portion is darkened. In other words, the values $y_{n+1}(i,j)$ are fixed at zero.

This darkening is not visible, taking into account the frequency of acquisition of the images and the customarily rapid movements of displacement of the table. In practice, it has been observed that this darkening is not visible when it does not exceed 10% of the image for the most rapid displacement movement.

In the mode of use just described, the coordinates u and v are determined from the movement of the table. This being so, it is also possible as a variant to calculate the coordinates u and v of displacement vector $\vec{D}$ directly between two acquired successive images by standard algorithms of detection of movement, by using, for example, the maximum criterion of correlation between two environments of two homologous pixels.

Materially, the displacement of filtered images is very simply carried out by using the delay elements connected to the lines and columns of the image storage memory.

Various modifications in structure and/or steps and/or function may be made by one skilled in the art without departing from the scope of the invention.

What is claimed is:

1. A method of treatment of a sequence of x-ray images of a body, comprising:
    acquiring an image sequence including a current image and a preceding image, filtering the preceding image, and applying a displacement vector to the preceding filtered image, thereby defining a displaced preceding filtered image;
    elaborating for each acquired current image of a current filtered image from the acquired current image and from the preceding filtered image; and
    visualizing the elaborated and filtered image sequence;
    wherein for each acquired current image, a displacement of the current image is determined relative to the acquired preceding image in an image acquisition plane, the displaced preceding filtered image is elaborated by spatially displacing the preceding filtered image, taking the displacement of the current image into account, and the current filtered image is elaborated by a weighted average by applying a first weighting coefficient to the displaced preceding filtered image and a second weighting coefficient to the acquired current image, so as to improve the quality of the images visualized.

2. The method according to claim 1, in which the body is laid on a movable table, wherein the displacement of the current image is determined in the image acquisition plane from the value of displacement of the table and spatial orientation and distance of the acquisition plane relative to the table.

3. The method according to claim 1, wherein the displacement of the current image is determined in the image acquisition plane from content of the acquired images.

4. The method according to claim 1, wherein the sum of the first and the second weighting coefficients is equal to one.

5. The method according to claim 1, wherein the first weighting coefficient is less than the second weighting coefficient.

6. The method according to claim 1, wherein the first weighting coefficient is equal to about 0.2.

7. The method according to claim 6, wherein the first weighing coefficient is a function of the acquired current image, the displaced preceding filtered image, or both.

8. The method according to claim 1, wherein the second weighting coefficient is a function of the first weighting coefficient.

9. A method of treatment of a sequence of x-ray images of a body, comprising:
    acquiring an image sequence including a current image and a preceding image, the current image being displaced relative to the preceding image;
    filtering the preceding image, and providing a displaced preceding filtered image by taking the displacement of the current image relative to the preceding image into account and spatially displacing the preceding filtered image;
    calculating a current filtered image as a function of the acquired current image and the displaced preceding filtered image; and
    visualizing the current filtered image sequence;
    wherein for each acquired current image, a displacement of the current image is determined relative to the acquired preceding image in an image acquisition plane, and the current filtered image is elaborated by a function rule applied to the acquired current image and the displaced preceding filtered image, so as to improve the quality of the images visualized;
    wherein the function rule comprises a weighted average, and the current filtered image is elaborated by a weighted average according to the following:
    applying a first weighting coefficient to the displaced preceding filtered image and a second weighting coefficient to the acquired current image.

10. The method according to claim 9, wherein the sum of the first and the second weighting coefficients is equal to one.

11. The method according to claim 9, wherein the first weighting coefficient is less than the second weighting coefficient.

12. The method according to claim 9, wherein the second weighting coefficient is a function of the first weighting coefficient.

* * * * *